United States Patent

[11] 3,552,513

| [72] | Inventor | James T. Sawyer<br>5721 Tannahill Circle SE, Huntsville, Ala. 35802 |
|---|---|---|
| [21] | Appl. No. | 868,746 |
| [22] | Filed | Oct. 23, 1969 |
| [45] | Patented | Jan. 5, 1971 |

[54] COUNTING AND COMPUTING SCALES
6 Claims, 10 Drawing Figs.

[52] U.S. Cl. .................................................. 177/25, 177/34, 177/216
[51] Int. Cl. ..................................................... G01g 1/04, G01g 19/41
[50] Field of Search .......................................... 177/216, 220—224, 190, 194, 25, 34, 41, 44

[56] References Cited
UNITED STATES PATENTS

| 373,568 | 11/1887 | Richtmann ................. | 177/34 |
| 1,576,914 | 3/1926 | Jouan .......................... | 177/194X |

*Primary Examiner*—Robert S. Ward, Jr.
*Attorney*—C. A. Phillips

ABSTRACT: A computing scales consisting of a generally T-shaped pendulum in which the pendulum is pivoted for suspension at the cross points of the "T," and range scaling of the scales is adjusted by the addition of weights at predetermined points along a vertical portion of the "T" below the pivot suspension point.

PATENTED JAN 5 1971

James T. Sawyer,
INVENTOR

BY
C. A. Phillips
ATTORNEY

PATENTED JAN 5 1971

James T. Sawyer,
INVENTOR

BY

C. A. Phillips
ATTORNEY

COUNTING AND COMPUTING SCALES

This invention relates to weighing scales and particularly to scales capable of precise weighing, counting and computations with respect to very lightweight objects.

Computing or counting scales are generally of the type wherein a group of objects to be counted are applied to a pan at one side of a balance arm wherein the leverage ratio is fixed with respect to a second pan. When the scale is balanced, objects placed in the second pan are a fixed multiple of objects placed in the first pan. These scales commonly have two fixed ratios with three pans, e.g., ratios at 9 and 99. They are relatively expensive and relatively insensitive. The difficulty in the past has been that scales of this design simply cannot be built at a reasonable cost for the counting of very light objects, for example, items of weights in the range .01 to 1.0 grams. Further, on existing computing or accounting scales a primary difficulty is both range and sensitivity. Typically, for example, they would have but two ranges of 9 to 1 or 99 to 1, and their sensitivity would be limited to approximately ⅓ of a gram.

Object counting can also be achieved by electrically or optically detecting objects as they are moved by a detector capable of sensing their presence. Typically in such a counting system, items to be counted are moved along a path and by electrical or photoelectrical sensing, an electrical indication is obtained for each item as it passes the sensing point, and a total count computed. While this approach works well with some types of items, it does not work well with others. A typical difficulty is that such a device must be designed around the characteristics of a particular items to be counted, its size, shape, etc. Thus, it is difficult, if not impossible, to design an electronic counting system of universal applicability. As an example of the diverse products and of the varying requirements that would need to be met in a general application electronic object counter, consider that ideally such counter would need to count items which differ substantially in size and shape such as electrical transisters or resistors on one hand and pharmaceutical pills or capsules on the other hand. Apparently, because of such diversity of characteristics, electrical or automated counters are not known to be available for universal application.

It is obvious that there is still another approach, that is counting by hand, and unfortunately there are many applications today where neither existing counting scales or electrical object counters are available, practical or feasible, and counting is still accomplished by hand.

It is an object of this invention to overcome the aforesaid and other difficulties and to provide a counting scales for items which are generally too light in weight to be accommodated by normal beam type scales and for which no electronic counting apparatus are either practical or available.

It is another object of this invention to provide a counting or computing scales with a wide and continuous range of multipliers.

These and other objects, features and advantages of this invention will become more apparent from the following description when considered together with the drawings in which.

Figure 1:
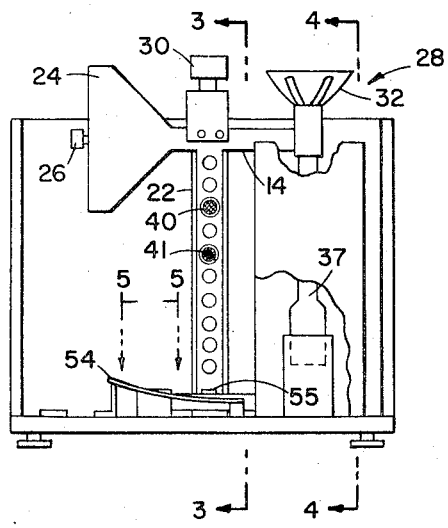
FIG. 1 is a front elevation view of a preferred embodiment of the invention.
Figure 2:
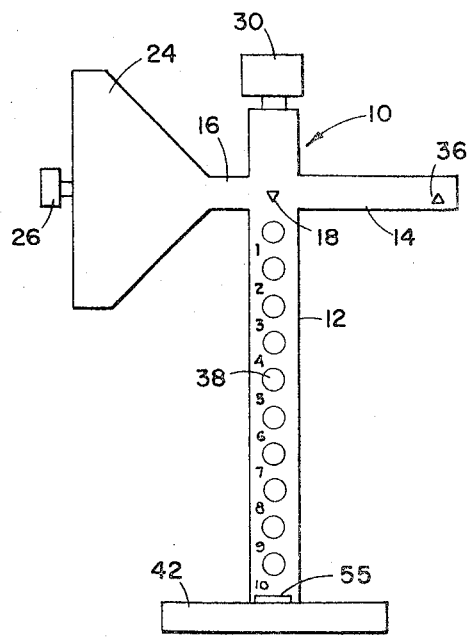
FIG. 2 is an elevation view of a pendulum constructed in accordance with the invention.
Figure 3:
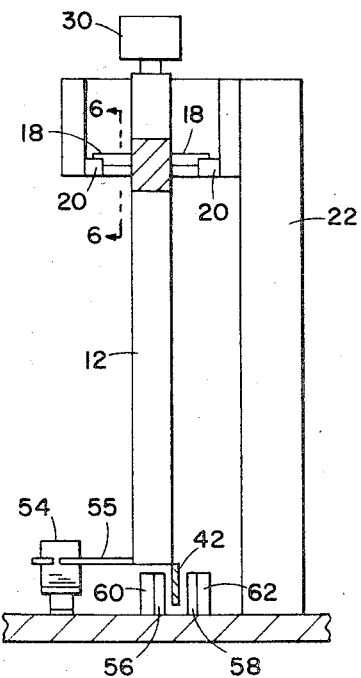
FIG. 3 is a side elevation view of the pendulum shown in FIG. 2.
Figure 4:
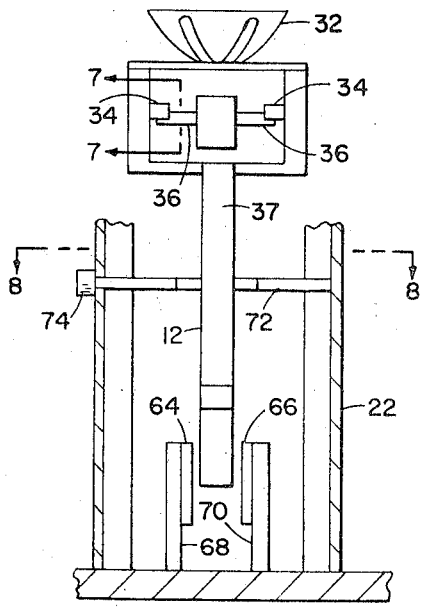
FIG. 4 is a side elevation view, less a portion removed, of the invention as illustrated in FIG. 1.

Referring now to the drawings, pendulum 10 is constructed generally T-shaped in configuration It includes a vertical balance member 12, and, oppositely extending from vertical balance member 12, horizontal balance arm 14 and horizontal counterbalance arm 16. Pendulum 10 is suspended by means of a knife edge pivot 18 on pivot supporting blocks 20 (FIG. 3) in turn supported by basic frame member 22. Fixed counter balance weight 24 and adjustable counter balance 26 provide means for balancing out the tare provided by receptacle or tray assembly 28. Vertical counter balance weights 30 screw into pendulum 10, above pivot 18, to provide vertical balance adjustment of the pendulum. Normally this need only be accomplished once and this adjustment is made by tilting pendulum 10 and adjusting balance weight 30 so that the pendulum will remain in the position to which it is tilted. Prior to this adjustment balance weight 26 would have been adjusted for horizontal balance or level of balance arms 14 and 16. The center of gravity of pendulum 10 is now at the pivot knife edge of pivot 18.

Figure 7:
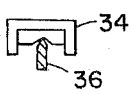
Figure 8:
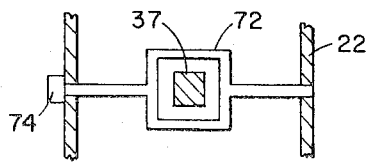
Figure 10:
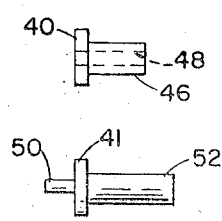

Tray 32 of tray assembly 28 is supported through pivot block 34 on knife edge pivot 36 (FIG. 7) of balance arm 14 and it applies a truly vertical force to pivot 36 by virtue of the weight of extension arm 37 which maintains arm 37 in a truly vertical position despite the occurrence of off balance orientation of pendulum 10. Vertical balance member 12 has 10 slots or holes 38, individually labeled 1—10, equally spaced downward from pivot 18 a distance $r_1$, $r_2$, $r_3$, etc. Plug weights 40 and 41 (FIG. 10) are adapted to plug into any one of the slots either singularly or together. Plug weight 40 is of a weight representative of a "units" weight in effect and plug weight 41 of a "tens" weight in effect. Thus by putting a unit weight 40 in slot 2, twice as much weight must be placed in tray 36 to cause pendulum 10 to tilt to a given @ then with unit weight plug 40 in slot 1, or, if a "tens" weight 41 is so placed in slot 2 the effect is multiplied 20 times over that which would exist with the unit weight in slot 1. Thus with one "tens" weight and one "units" weight, weight multiplication or division can be achieved up to a factor of 110 and with three weights, two "tens" weights and one "units" weights up to a factor of 200.

Plug weight 40 is cylindrical having a reduced diameter region 46 (FIG. 10) adapted to fit into a slot 38 of pendulum 10 and a cylindrical cavity 48 adapted to slip over and mate with an end region 50 of plug weight 41. Plug weight 41 has an opposite end region 52 adapted to fit into a hole 38 and an enlarged collar region separating end regions 50 and 52. With this construction of weights 40 and 41, these weights may plug into separate holes 38 or be joined together and then be attached in a single hole 38.

Readout scale 54 is calibrated in .01-gram units and accurate weight, and thus counting readings, are possible of objects weighing as little as a few hundredths of a gram.

Figure 9:
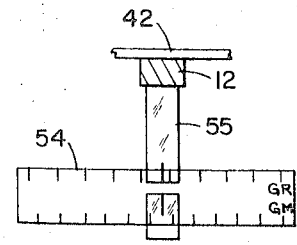

The weight measurement and computing system of this invention may be regarded as a torsional spring system wherein the spring function is provided by pendulum 10. To analyze the theory of operation of the system assume that a single object of weight $w$ is placed in tray 32 and a "unit" weight 40 is placed in hole 38-1. Then note the point or reading of alignment between arm 55 of pendulum 10 and scale 54 (FIG. 9) resulting from the rotation or tilting of pendulum 10 by virtue of the weight of the single object. This reading indicates the weight of the single object. In tilting pendulum 10 it will have swung through an @ $\theta$ as follows:

Accordingly:

$$\text{Ton } \sigma = \frac{1w}{r_1 w_1}$$

Where:
 $\sigma$ = is in radians
 1 = the lever arm distance from pivot 18 to pivot 32
 $w$ = weight of a single object
 $r_1$ = distance from pivot 18 to the center of hole 38–1
 $w_1$ = weight of unit weight 40

Then if a number $n$ of objects of a like equal unit weight $w$ are placed in tray 32:

$$N r_1 \text{ Ton } \sigma(w_1) + M r_1 \text{ Ton } \sigma(10 W_1) = 1 n w$$

or:

$$\text{Ton } \sigma = \frac{1 n w}{r_1 w_1 (N + 10 M)}$$

Then if:
$N + 10M = n$
$\sigma$ will be the same in both cases
In this equation:
$N$ = the whole numbered slot of slots 38-1 to 38-10 that weight $W_1$ is placed in and
$M$ = whole numbered slot in which weight $W_{10}$ is placed For example: $n = 48$ if $\theta$ is obtained when a $W_{10}$ weight is placed in hole 4 and a $W_1$ weight is placed in hole 8. In another case, if: $n = 66$ weight $W_1$ would be slipped over the end of weight $W_1$, then $W_{10}$ is inserted in holes 6, making: $N + 10M = 66$. Though the combination of weights and holes shown will count to 110, it is obvious that by adding holes and weights any number can be obtained up to the practical limits of size and weight of the apparatus.

In using the apparatus, as for example in taking an inventory, the procedure is as follows. One of the items is first weighed as described above and the scale position or reading on scale 44 noted. Then the group of such items to be counted are placed in tray 32 and weights $W_{10}$ and $W_1$ selectively placed in slots 38 until pendulum 10 returns to its previously observed position with one item in tray 32. The count or number of items is indicated by the position of weights 41 and 40. For example, if 10's weight 41 ends up in hole 5 and units weight 40 in hole 2, the correct number of items is 52. If there is some known variation in the unit weights of items then scale division, and thus the average weight of a single object, can be accomplished by placing, for example, five objects in tray 32 and the unit weight 40 in number 5 hole. Then the indicated weight on scale 54 will be the average weight of a single object.

Figure 5:
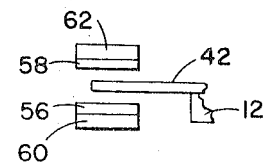
FIGS. 5—10 are detail drawings of various elements of the invention as shown in FIG. 1.
Figure 6:
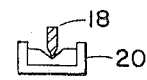

Pendulum 10 is magnetically damped, to prevent excessive oscillation by means of magnets 56 and 58 (FIG. 5) supported by bases 60 and 62 and positioned on each side of an aluminum vane 42 attached to the lower end of pendulum 10. Similarly vertical extension arm 37, which vertically stabilizes tray assembly 28, is in turn magnetically damped by magnets 64 and 66 supported by mounting supports 68 and 70. Locking or steadying arm 72 is supported by frame member 22 and is rotatable by means of knob 74 to a position to contact and stop vertical extension arm 37 from movement in order to dampen oscillations caused by placing objects in tray 32.

In summary, there has been described a new weighing and computation scales which permits extremely accurate weighing of very light objects and computations with respect to the number of objects placed in the receiving tray of the scales. To enhance accuracy, weight averaging of single units can be readily achieved by weighing a known number of items and setting the pendulum balance weights at corresponding positions. The apparatus is simple to calibrate and operate by virtue of the features described above and it is believed to provide for the first time an extremely accurate computation or counting scale s capable of distinguishing, and thus counting, objects weighing as little as .01 grams. Thus, the invention introduces and provides a basically universal counter for counting extremely light objects and regardless of their shape or size and without employing complex or costly structures.

I claim:
1. A computing scales comprising:
    A. a supporting frame including first pivotal support means;
    B. a generally T-shaped pendulum assembly, comprising:
        1. an elongated vertical balance member,
        2. mounting means for rotatably suspending said pendulum assembly on said first pivotal support means with said vertical balance member vertically suspended in an index position when said pendulum assembly is balanced,
        3. a horizontal balance member supported by and extending outward from said vertical balance member and including second pivotal support means,
        4. a horizontal counterbalance member connected to said vertical balance member and extending outward from said vertical balance member in a direction generally opposite to that of said horizontal balance member, and
        5. scaling means supported by said vertical balance member for selectively varying the moment and indicating the computation presented by said vertical balance member;
    C. receptacle means for supporting items to be counted and including means in engagement with second pivotal support means for supporting and maintaining said receptacle means in a vertical orientation independent of the orientation of said pendulum assembly; and
    D. index means positioned adjacent to a portion of said vertical balance member for indicating the degree of departure of said pendulum assembly from a balanced position wherein a scales reading can be determined.

2. A computing scales as set forth in claim 1 wherein said scaling means comprises a plurality of vertically spaced receptacles for holding counter weights.

3. A computing scales as set forth in claim 2 wherein said scaling means comprises a plurality of spaced holes comprising said receptacles.

4. A computing scales as set forth in claim 2 wherein said spaced receptacles are positioned below said mounting means and wherein rotation of said pendulum assembly from a balanced position elevates the level of said receptacles.

5. A computing scales as set forth in claim 4 wherein said counter balance member includes means for adjusting the horizontal balance of said pendulum assembly.

6. A computing scales as set forth in claim 5 further comprising vertical counter balance adjustment means comprising a portion of said vertical balance member extending above said mounting means.